United States Patent
Hsieh et al.

(10) Patent No.: US 12,517,815 B2
(45) Date of Patent: Jan. 6, 2026

(54) MEMORY CONTROL CIRCUIT AND MEMORY CONTROL METHOD

(71) Applicant: REALTEK SEMICONDUCTOR CORP., Hsinchu (TW)

(72) Inventors: Min-Yen Hsieh, Hsinchu (TW); Kai-Ting Shr, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 18/912,072

(22) Filed: Oct. 10, 2024

(65) Prior Publication Data

US 2025/0355795 A1   Nov. 20, 2025

(30) Foreign Application Priority Data

May 17, 2024   (TW) ................. 113118453

(51) Int. Cl.
*G06F 12/02* (2006.01)

(52) U.S. Cl.
CPC ................. *G06F 12/0223* (2013.01)

(58) Field of Classification Search
CPC ...... G06F 12/02; G06F 12/0223; G06F 12/00; G06F 13/10
See application file for complete search history.

(56) References Cited

U.S. PATENT DOCUMENTS

2015/0154192 A1 * 6/2015 Lysne ................. G06N 5/00
                                                            707/758
2021/0126683 A1 * 4/2021 Shikida ................ H04B 7/0482
2021/0157992 A1 * 5/2021 Chen ................... G06N 3/044
2021/0390053 A1   12/2021 Roberts
2021/0392524 A1 * 12/2021 Ishihara ............... H04W 24/08
2022/0027083 A1   1/2022 Zuolo et al.
(Continued)

FOREIGN PATENT DOCUMENTS

CN    107704922 A     2/2018
EP      1936628 A1 *  6/2008   ............. G11C 8/12
TW    202025004 A     7/2020
(Continued)

*Primary Examiner* — Pierre Michel Bataille
(74) *Attorney, Agent, or Firm* — Birch, Stewart, Kolasch & Birch, LLP (57) ABSTRACT

A memory control circuit includes a plurality of main terminal circuits, a monitoring unit, an arithmetic unit, and a memory controller. The main terminal circuits output a plurality of control commands. The monitoring unit generates an operation record based on each of the control commands. The arithmetic unit includes a recurrent neural network module. The arithmetic unit generates a corresponding first feature vector based on the operation record and generates a plurality of second feature vectors based on the first feature vectors corresponding to a plurality of candidate combinations. The recurrent neural network module obtains estimated efficiency information based on the second feature vectors and selects a candidate combination corresponding to one piece of the estimated efficiency information as a selected main terminal combination. The memory controller is configured to execute the control command corresponding to each main terminal circuit in the selected main terminal combination for a memory.

18 Claims, 4 Drawing Sheets

(56) References Cited

U.S. PATENT DOCUMENTS

2023/0188384 A1* 6/2023 Claffey ................ H04L 25/022
375/262

FOREIGN PATENT DOCUMENTS

| TW | 202207031 A | 2/2022 | | |
|---|---|---|---|---|
| WO | WO-2021036904 A1 * | 3/2021 | ............. | G06N 3/084 |
| WO | WO-2021036905 A1 * | 3/2021 | ............. | G06N 3/045 |

* cited by examiner

MEMORY CONTROL CIRCUIT AND MEMORY CONTROL METHOD

CROSS-REFERENCE TO RELATED APPLICATION

This non-provisional application claims priority under 35 U.S.C. § 119 (a) to patent application No. 113118453 filed in Taiwan, R.O.C. on May 17, 2024, the entire contents of which are hereby incorporated by reference.

BACKGROUND

Technical Field

The present disclosure relates to a control circuit, in particular, to a memory control circuit and a memory control method.

Related Art

For a memory control element in an electronic circuit system, time required for the memory control element to complete a memory access request of each module in a system is different due to various different conditions such as memory specifications, system and memory clock frequency, architecture and setting of a memory control element, and characteristics of modules that need to access a memory in the system. Since access efficiency of the memory control element and the memory controlled by the memory control element is highly related to system performance, it is necessary to estimate the time required for the memory control element to complete the access request and operating efficiency.

SUMMARY

In view of the above, a memory control circuit coupled to a memory is provided. In an embodiment, the memory control circuit includes a plurality of main terminal circuits, a first monitoring unit, an arithmetic unit, and a memory controller. Each of the main terminal circuits is configured to output a plurality of control commands corresponding to the memory within a time interval. The first monitoring unit is coupled to the main terminal circuits and configured to monitor an operation behavior of each of the control commands on the memory to generate an operation record corresponding to each control command. The arithmetic unit is coupled to the main terminal circuits and the first monitoring unit, and includes a first recurrent neural network module. The arithmetic unit is configured to encode the operation records corresponding to a same main terminal circuit into a first feature vector in time sequence, and generate a plurality of second feature vectors based on at least one of the first feature vectors corresponding to a plurality of candidate combinations. The first recurrent neural network module obtains estimated efficiency information based on the second feature vectors, and selects a candidate combination corresponding to one piece of the estimated efficiency information as a selected main terminal combination. The candidate combination is a group composed of a candidate quantity of main terminal circuits selected from the main terminal circuits. The memory controller is coupled to the memory, the main terminal circuits, and the arithmetic unit, and configured to execute the control command corresponding to each of the main terminal circuits in the selected main terminal combination for the memory.

In an embodiment, the memory control circuit further includes a plurality of second recurrent neural network modules, respectively coupled to the corresponding main terminal circuits and the arithmetic unit, where each of the second recurrent neural network modules obtains an operation prediction based on the operation record of each corresponding main terminal circuit.

In an embodiment, the arithmetic unit is configured to encode the operation records and the operation prediction corresponding to a same main terminal circuit into the first feature vector in time sequence.

In an embodiment, the first recurrent neural network module obtains the estimated efficiency information based on the second feature vectors and a historical selected main terminal combination.

In an embodiment, the memory control circuit further includes a second monitoring unit. The second monitoring unit is coupled to the memory and the arithmetic unit, and is configured to monitor an idle state of the memory to obtain an idle record. The first recurrent neural network module selects the candidate combination corresponding to one piece of the estimated efficiency information and the idle record as the selected main terminal combination.

In an embodiment, each of the second recurrent neural network modules performs machine learning based on the operation records and the operation prediction of the corresponding main terminal circuit.

In an embodiment, each of the second recurrent neural network modules obtains the operation prediction based on a predetermined quantity of operation records.

A memory control method is further provided, including: controlling a plurality of main terminal circuits to output a plurality of control commands corresponding to a memory within a time interval; monitoring an operation behavior of each of the control commands on the memory to generate an operation record corresponding to each control command; encoding the operation records corresponding to one of the main terminal circuits into a first feature vector in time sequence, and generating a plurality of second feature vectors based on at least one of the first feature vectors corresponding to a plurality of candidate combinations; and obtaining, by a first recurrent neural network module, estimated efficiency information based on the second feature vectors, and selecting a candidate combination corresponding to one piece of the estimated efficiency information as a selected main terminal combination; and executing the control command corresponding to each of the main terminal circuits in the selected main terminal combination for the memory.

Based on the above, according to the memory control circuit and the memory control method of any embodiment, a task schedule of each main terminal circuit can be determined by using a recurrent neural network, so as to optimize operation efficiency (such as read/write efficiency) of the memory. That is, based on the operation record generated by the operation behavior of each main terminal circuit on the memory, the first recurrent neural network module is used to perform prediction to select the candidate combination with the optimal estimated efficiency as the selected main terminal combination, and then the memory controller executes the control command corresponding to each main terminal circuit in the selected main terminal combination for the memory.

DETAILED DESCRIPTION

Figure 1:
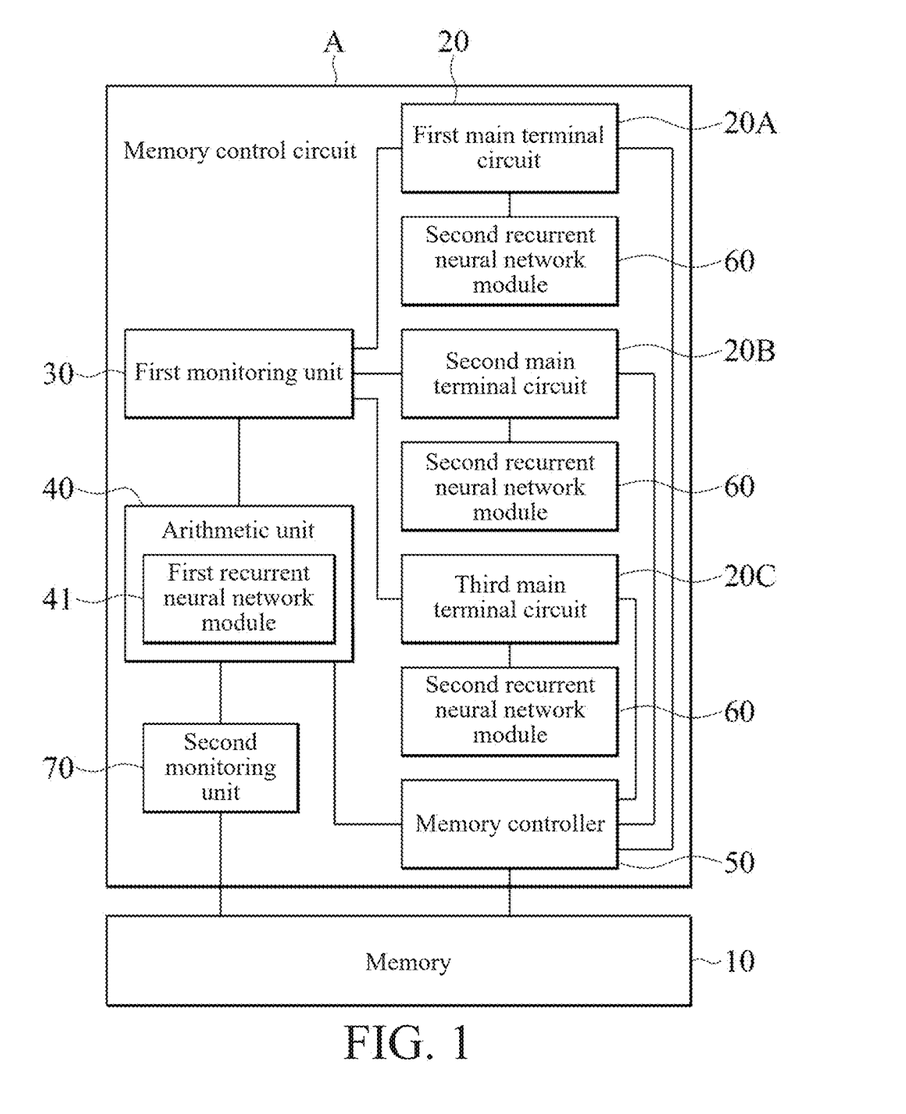
FIG. 1 is a schematic diagram showing connection of all elements of a memory control circuit in some embodiments.

Referring to FIG. 1, the present disclosure relates to a memory control circuit A. The memory control circuit A is coupled to a memory 10 and includes a plurality of main terminal circuits 20, a first monitoring unit 30, an arithmetic unit 40, and a memory controller 50. The memory controller 50 is coupled to the memory 10, the main terminal circuits 20, and the arithmetic unit 40. In an embodiment, the memory control circuit A includes the memory 10 that is directly or indirectly coupled thereto. In an embodiment, the memory controller 50 includes the memory 10, the main terminal circuits 20, and the arithmetic unit 40 that are directly or indirectly coupled thereto.

Figure 2:
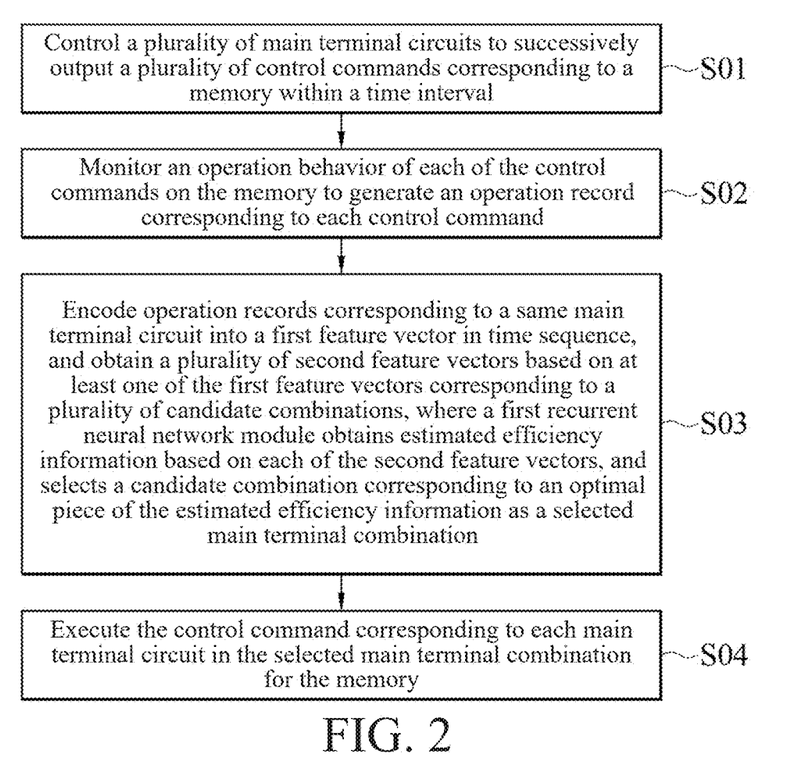
FIG. 2 is a flowchart showing a memory control method in some embodiments.
Figure 3:
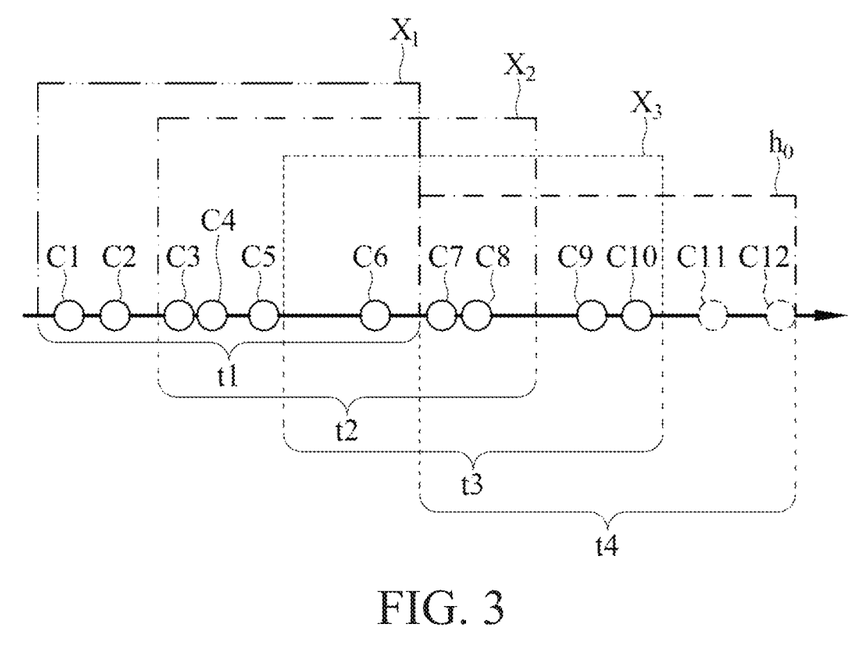
FIG. 3 is a schematic diagram showing that a main terminal circuit outputs a plurality of control commands corresponding to a memory within a time interval in some embodiments.

Referring to FIG. 1 and FIG. 2, each of the main terminal circuits 20 is configured to output a plurality of control commands corresponding to the memory 10 within a time interval (step S01). In some embodiments, each main terminal circuit 20 is configured to successively output a plurality of control commands corresponding to the memory 10 within a time interval. Referring to FIG. 3, for example, there are 6 control commands in total within a first time interval t1, 6 control commands in total within a second time interval t2, and 5 control commands in total within a third time interval t3. In addition, the quantity of control commands within each time interval is different, and FIG. 3 is only an illustration. In an embodiment, as shown in FIG. 3, the first time interval t1 and the second time interval t2 partially overlap, and therefore the 6 control commands $C_1$-$C_6$ in data transmitted for the first time and the 6 control commands $C_3$-$C_8$ in data transmitted for the second time overlap by four repeated control commands $C_3$-$C_6$. The second time interval t2 and the third time interval t3 partially overlap, and therefore the 6 control commands $C_3$-$C_8$ in the data transmitted for the second time and the 5 control commands $C_6$-$C_{10}$ in data transmitted for the third time overlap by three repeated control commands $C_6$-$C_8$. In an embodiment, the main terminal circuit 20 is a specifically a direct memory access device (DMA). In an embodiment, the control command is a write command that specifies an operation as a write operation or a read command that specifies an operation as a read operation.

Referring to FIG. 1 and FIG. 2, the first monitoring unit 30 is coupled to each main terminal circuit 20. In an embodiment, the first monitoring unit 30 includes each main terminal circuit 20 that is directly or indirectly coupled thereto. The first monitoring unit 30 is configured to monitor an operation behavior of each of the control commands on the memory 10 to generate an operation record corresponding to each control command (step S02). Referring to FIG. 3, in an embodiment, the operation record includes a plurality of control commands within a time interval. For example, the 6 control commands $C_1$-$C_6$ in total within the first time interval t1 represent a first operation record $X_1$, the 6 control commands $C_3$-$C_8$ in total within the second time interval t2 represent a second operation record $X_2$, and the 5 control commands $C_6$-$C_{10}$ in total within the third time interval t3 represent a third operation record $X_3$. In an embodiment, the operation record includes a data operation amount, a time interval, and an operation completion time. The data operation amount includes a data reading amount and a data writing amount. The operation completion time includes a data reading completion time and a data writing completion time. In an embodiment, the operation record further includes a read/write address of data.

Referring to FIG. 1, the arithmetic unit 40 is coupled to each main terminal circuit 20 and the first monitoring unit 30, and includes a first recurrent neural network module 41. In an embodiment, the arithmetic unit 40 includes each main terminal circuit 20 and the first monitoring unit 30 that are directly or indirectly coupled thereto. In an embodiment, the first recurrent neural network module 41 includes a long short-term memory (LSTM) module and gated recurrent units (GRUs). The arithmetic unit 40 is configured to encode the operation records corresponding to one of the main terminal circuits 20 into the first feature vector in time sequence. That is to say, as shown in FIG. 1 and FIG. 3, an example in which the plurality of main terminal circuits 20 include a first main terminal circuit 20A, a second main terminal circuit 20B, and a third main terminal circuit 20C is used. The arithmetic unit 40 encodes the operation records $X_1, X_2, X_3, \ldots$, and $X_n$ of the first main terminal circuit 20A into a first feature vector $Y=[X_1, X_2, X_3, \ldots, X_n]$ in time sequence, where n is a quantity of main terminal circuits 20. For the remaining main terminal circuits 20B and 20C, details are not described again.

In some embodiments, a parameter combination of the first feature vector is a specified operation type (read or write), a required data operation amount, a read/write address, and a read/write time interval.

To estimate which one or more control commands of the main terminal circuit 20 are most efficient for the memory controller 50 to execute at a next time point, the arithmetic unit 40 determines candidate combinations based on a quantity of sources (the main terminal circuits 20) that can execute the control commands at the next time point. Next, the arithmetic unit 40 generates a plurality of second feature vectors based on the first feature vectors corresponding to a plurality of candidate combinations. An example in which one source executes a control command is used as an example. A first candidate combination is the first main terminal circuit 20A, and the generated first second feature vector is the first feature vector of the first main terminal circuit 20A. A second candidate combination is the second main terminal circuit 20B, and the generated second second feature vector is a first feature vector of the second main terminal circuit 20B. A third candidate combination is the third main terminal circuit 20C, and the generated third second feature vector is a first feature vector of the third main terminal circuit 20C. That is, the arithmetic unit 40 respectively generates three second feature vectors based on the first feature vectors corresponding to the three candidate combinations. For another example, for two main terminal circuits 20 that can execute the control commands at the next time point, as shown in Equation 1, a candidate combination is the first main terminal circuit 20A and the second main terminal circuit 20B, and the generated first second feature vector is a combination of the first feature vector Ya of the first main terminal circuit 20A and the first feature vector Yb of the second main terminal circuit 20B. Another candidate combination is the second main terminal circuit 20B and the third main terminal circuit 20C, and the generated second second feature vector is a combination of the first feature vector of the second main terminal circuit 20B and the first feature vector of the third main terminal circuit 20C. Still another candidate combination is the third main terminal circuit 20C and the first main terminal circuit 20A, and the generated third second feature vector is a combination of the first feature vector of the third main terminal circuit 20C and the first feature vector of the first main terminal circuit 20A. In this way, the arithmetic unit 40 respectively generates three second feature vectors based on the first feature vectors corresponding to the three candidate combinations, and so on. Details are not described again.

$$\begin{bmatrix} Y_a \\ Y_b \end{bmatrix} = \begin{bmatrix} X_a, X_{a+1}, X_{a+2}, \ldots, X_{a+n} \\ X_b, X_{b+1}, X_{b+2}, \ldots, X_{b+n} \end{bmatrix} \quad \text{Equation 1}$$

Figure 5:
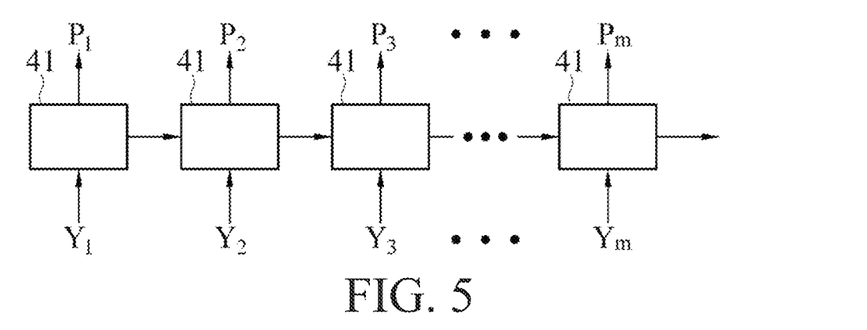
FIG. 5 is a schematic diagram showing an operation process of a first recurrent neural network module in some embodiments.

Referring to FIG. 1, FIG. 2, FIG. 3, and FIG. 5, the first recurrent neural network module 41 obtains estimated efficiency information based on the second feature vector (step S03), that is, predicts operation efficiency of the candidate combination based on the second feature vector. In some embodiments, the first recurrent neural network module 41 obtains the estimated efficiency information based on each second feature vector or some of the second feature vectors. In some embodiments, the estimated efficiency information is a total estimated operation amount within a time interval, including a total data reading amount and a total data writing amount. Referring to FIG. 5, for example, when the candidate combination is the first main terminal circuit 20A, the total amount of data read/written of the memory 10 controlled by the first main terminal circuit 20A based on the control command within a fourth time interval t4 may be estimated through the first recurrent neural network module 41. Therefore, the first feature vector $Y_1$ formed by each candidate combination is inputted to the first recurrent neural network module 41. Then the first recurrent neural network module 41 selects a candidate combination corresponding to one piece of the estimated efficiency information as a selected main terminal combination $P_1$. In an embodiment, the first recurrent neural network module 41 selects a candidate combination corresponding to an optimal piece of the estimated efficiency information as a selected main terminal combination $P_1$, where the optimal estimated efficiency information indicates highest estimated efficiency. In an embodiment, the first recurrent neural network module 41 selects a candidate combination corresponding to an appropriate one piece of the estimated efficiency information as a selected main terminal combination $P_1$. For example, when the first recurrent neural network module 41 determines that the prediction efficiency of the candidate combination of the first main terminal circuit 20A and the second main terminal circuit 20B is optimal, the first main terminal circuit 20A and the second main terminal circuit 20B are selected as the selected main terminal combination $P_1$. The first feature vector $Y_1$ represents the first feature vector formed by the candidate combinations within the first time interval t1, and the selected main terminal combination $P_1$ represents the candidate combination with the optimal estimated efficiency predicted within the second time interval t2. For the remaining first feature vectors $Y_1$-$Y_m$ and the selected main terminal combination $P_1$-$P_m$, details are not described again. In addition, m is a positive integer.

Referring to FIG. 1 and FIG. 2, the memory controller 50 executes the control command corresponding to each main terminal circuit 20 in the selected main terminal combination for the memory 10 (step S04). For example, when the first main terminal circuit 20A and the second main terminal circuit 20B are selected as the selected main terminal combinations, the memory controller 50 executes the control command of the first main terminal circuit 20A and the control command of the second main terminal circuit 20B to operate the memory 10.

In an embodiment of the present disclosure, based on the operation record generated by the operation behavior of each main terminal circuit 20 on the memory 10, the first recurrent neural network module 41 is used to perform prediction to select the candidate combination with the optimal estimated efficiency as the selected main terminal combination, and then the memory controller 50 executes the control command corresponding to each main terminal circuit 20 in the selected main terminal combination for the memory 10. Therefore, in the present disclosure, the first recurrent neural network module 41 is used to determine a task schedule of each main terminal circuit 20, so as to optimize operation efficiency of the memory 10.

Figure 4:
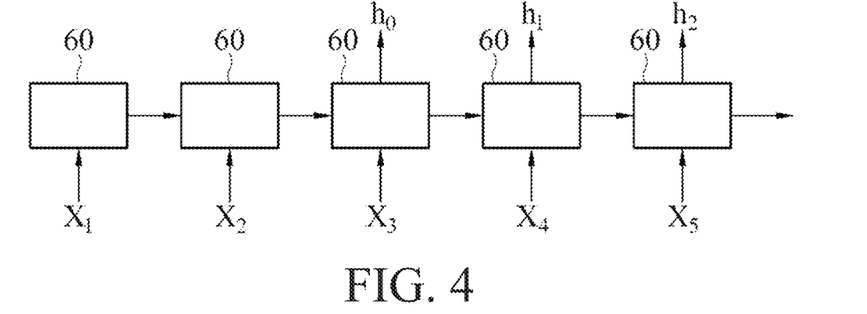
FIG. 4 is a schematic diagram showing an operation process of a second recurrent neural network module in some embodiments.

Referring to FIG. 1, FIG. 3, and FIG. 4, in an embodiment, the memory control circuit A further includes a plurality of second recurrent neural network modules 60. The second recurrent neural network modules 60 are respectively coupled to each corresponding main terminal circuit 20 and the arithmetic unit 40. Each of the second recurrent neural network modules 60 obtains an operation prediction $h_0$ based on the operation record of each corresponding main terminal circuit 20. In an embodiment, each second recurrent neural network module 60 includes the corresponding main terminal circuit 20 and the arithmetic unit 40 that are directly or indirectly coupled thereto. Referring to FIG. 3, for example, the second recurrent neural network module 60 predicts part of the third operation record $X_3$ (that is, part of the operation commands $C_7$-$C_{10}$ within the third time interval t3) and predicted operation commands $C_{11}$-$C_{12}$ within the fourth time interval t4. Therefore, the operation prediction $h_0$ is prediction of a fourth operation record $X_4$, and the operation prediction $h_0$ includes $C_7$-$C_{12}$. Referring to FIG. 4, in an embodiment, the second recurrent neural network module 60 first inputs the first operation record $X_1$ and the second operation record $X_2$ for adjustment. Therefore, when the second recurrent neural network module 60 inputs the third operation record $X_3$, prediction accuracy of the fourth operation record $X_4$ may be improved, that is, accuracy of the operation prediction $h_0$ within the fourth time interval t4. Similarly, when the fourth operation record $X_4$ is inputted to the second recurrent neural network module 60, an operation prediction $h_1$ is generated. The operation prediction $h_1$ is prediction of a fifth operation record $X_5$. For a sixth operation record (omitted in the drawing), an operation prediction $h_2$, and so on, details are not described again.

Referring to FIG. 1 and FIG. 3, in an embodiment, the arithmetic unit 40 is configured to encode the operation records and the operation prediction $h_0$ corresponding to one of the main terminal circuits 20 into the first feature vector in time sequence. Therefore, the first feature vector $Y=[X_1, X_2, \ldots, X_n, h_0]$. This enables the first recurrent neural network module 41 to estimate the efficiency based on the operation prediction $h_0$ outputted by the second recurrent neural network module 60, thereby improving prediction accuracy of the estimated efficiency information. In addition, the first recurrent neural network module 41 estimates the efficiency not only based on the operation prediction $h_0$ outputted by the second recurrent neural network module 60 but also based on a historical selected main terminal combination, so as to realize more accurate estimation. Therefore, in an embodiment, the first recurrent neural network module 41 obtains the estimated efficiency information based on the second feature vectors and the historical selected main terminal combination. In an embodiment, the first recurrent neural network module 41 obtains the estimated efficiency information based on the historical selected main terminal combination and each second feature vector or some of the second feature vectors.

Referring to FIG. 1, in an embodiment, the memory control circuit A further includes a second monitoring unit 70 coupled to the memory 10 and the arithmetic unit 40. In an embodiment, the second monitoring unit 70 includes the memory 10 and the arithmetic unit 40 that are directly or indirectly coupled thereto. The second monitoring unit 70 is configured to monitor an idle state of the memory 10 to obtain an idle record, and the idle record includes a refresh time of the memory 10. The first recurrent neural network module 41 selects a candidate combination corresponding to one piece of the estimated efficiency information and the idle record as the selected main terminal combination, so as to prevent the refresh time of the memory 10 from affecting the overall operation efficiency, thereby improving estimation accuracy of the first recurrent neural network module 41. In an embodiment, the first recurrent neural network module 41 selects a candidate combination corresponding to the optimal piece of the estimated efficiency information and the idle record as a selected main terminal combination $P_1$, where the optimal estimated efficiency information indicates highest estimated efficiency. In an embodiment, the first recurrent neural network module 41 selects a candidate combination corresponding to an appropriate one piece of the estimated efficiency information and the idle record as a selected main terminal combination $P_1$.

Referring to FIG. 1, in an embodiment, each second recurrent neural network module 60 performs machine learning based on the operation record and the operation prediction of the corresponding main terminal circuit 20, so as to improve prediction accuracy of the second recurrent neural network module 60.

What is claimed is:

1. A memory control method, comprising:
controlling a plurality of main terminal circuits to output a plurality of control commands corresponding to a memory within a time interval;
monitoring an operation behavior of each of the control commands on the memory to generate an operation record corresponding to each control command;
encoding the operation records corresponding to a same main terminal circuit into a first feature vector in time sequence, and generating a plurality of second feature vectors based on at least one of the first feature vectors corresponding to a plurality of candidate combinations; and obtaining, by a first recurrent neural network module, estimated efficiency information based on the second feature vectors, and selecting a candidate combination corresponding to one piece of the estimated efficiency information as a selected main terminal combination; and
executing the control command corresponding to each of the main terminal circuits in the selected main terminal combination for the memory.

2. The memory control method according to claim 1, further comprising:
obtaining, by each of a plurality of second recurrent neural network modules, an operation prediction based on the operation record of each corresponding main terminal circuit.

3. The memory control method according to claim 2, wherein the operation records and the operation prediction corresponding to the same main terminal circuit are encoded into the first feature vector in time sequence.

4. The memory control method according to claim 3, wherein the estimated efficiency information is obtained by the first recurrent neural network module based on the second feature vectors and a historical selected main terminal combination.

5. The memory control method according to claim 4, further comprising: monitoring an idle state of the memory to obtain an idle record, and selecting, by the first recurrent neural network module, the candidate combination corresponding to one piece of the estimated efficiency information and the idle record as the selected main terminal combination.

6. The memory control method according to claim 2, wherein each of the second recurrent neural network modules performs machine learning based on the operation record and the operation prediction of the corresponding main terminal circuit.

7. The memory control method according to claim 2, wherein each of the second recurrent neural network modules obtains the operation prediction based on a predetermined quantity of operation records.

8. The memory control method according to claim 1, wherein the operation record comprises a data operation amount, the time interval, and an operation completion time.

9. The memory control method according to claim 2, wherein the estimated efficiency information is a total estimated operation amount within a time interval.

10. A memory control circuit, coupled to a memory, wherein the memory control circuit comprises:
a plurality of main terminal circuits, wherein each of the main terminal circuits is configured to output a plurality of control commands corresponding to the memory within a time interval;
a first monitoring unit, coupled to the main terminal circuits and configured to monitor an operation behavior of each of the control commands on the memory to generate an operation record corresponding to each control command;
an arithmetic unit, coupled to the main terminal circuits and the first monitoring unit, and comprising a first recurrent neural network module, wherein the arithmetic unit is configured to encode operation records corresponding to a same main terminal circuit into a first feature vector in time sequence, and generate a plurality of second feature vectors based on at least one of the first feature vectors corresponding to a plurality of candidate combinations, and the first recurrent neural network module obtains estimated efficiency information based on the second feature vectors, and selects a candidate combination corresponding to one piece of the estimated efficiency information as a selected main terminal combination, wherein the candidate combination is a group composed of a candidate quantity of main terminal circuits selected from the main terminal circuits; and
a memory controller, coupled to the memory, the main terminal circuits, and the arithmetic unit, and configured to execute the control command corresponding to each of the main terminal circuits in the selected main terminal combination for the memory.

11. The memory control circuit according to claim 10, further comprising:
a plurality of second recurrent neural network modules, respectively coupled to the corresponding main terminal circuits and the arithmetic unit, wherein each of the second recurrent neural network modules obtains an operation prediction based on the operation record of each corresponding main terminal circuit.

12. The memory control circuit according to claim 11, wherein the arithmetic unit is configured to encode the operation records and the operation prediction corresponding to the same main terminal circuits into the first feature vector in time sequence.

13. The memory control circuit according to claim 12, wherein the first recurrent neural network module obtains the estimated efficiency information based on the second feature vectors and a historical selected main terminal combination.

14. The memory control circuit according to claim 13, further comprising a second monitoring unit, wherein the second monitoring unit is coupled to the memory and the arithmetic unit, and configured to monitor an idle state of the memory to obtain an idle record, and the first recurrent neural network module selects the candidate combination corresponding to one piece of the estimated efficiency information and the idle record as the selected main terminal combination.

15. The memory control circuit according to claim 11, wherein each of the second recurrent neural network modules performs machine learning based on the operation record and the operation prediction of the corresponding main terminal circuit.

16. The memory control circuit according to claim 11, wherein each of the second recurrent neural network modules obtains the operation prediction based on a predetermined quantity of operation records.

17. The memory control circuit according to claim 10, wherein the operation record comprises a data operation amount, the time interval, and an operation completion time.

18. The memory control circuit according to claim 11, wherein the estimated efficiency information is a total estimated operation amount within a time interval.

* * * * *